United States Patent
Fukano et al.

(10) Patent No.: US 9,742,513 B2
(45) Date of Patent: Aug. 22, 2017

(54) TRANSMISSION APPARATUS AND CLOCK REGENERATION METHOD

(71) Applicant: FUJITSU LIMITED, Kawasaki-shi, Kanagawa (JP)

(72) Inventors: Haruhisa Fukano, Munakata (JP); Kenichi Ohyama, Fukuoka (JP); Toshiharu Hirose, Fukuoka (JP); Katsuya Kinoshita, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/165,487

(22) Filed: May 26, 2016

(65) Prior Publication Data

US 2016/0373245 A1    Dec. 22, 2016

(30) Foreign Application Priority Data

Jun. 16, 2015   (JP) .................................. 2015-121541

(51) Int. Cl.
*H04J 3/06*    (2006.01)
*H04J 3/07*    (2006.01)

(52) U.S. Cl.
CPC ........... *H04J 3/0691* (2013.01); *H04J 3/0623* (2013.01); *H04J 3/07* (2013.01)

(58) Field of Classification Search
CPC ... H04L 7/0338; H04L 7/0337; H04L 7/0994; H04L 7/0995; H04J 3/0691; H04J 3/0623; H04J 3/07

See application file for complete search history.

(56) References Cited

U.S. PATENT DOCUMENTS

| | | | | |
|---|---|---|---|---|
| 2004/0091073 A1* | 5/2004 | Smith | ............... | H04L 7/0331 375/355 |
| 2005/0169417 A1* | 8/2005 | Amirichimeh | .......... | H03M 9/00 375/371 |
| 2006/0114032 A1* | 6/2006 | Geer | ............... | G01R 23/005 327/12 |
| 2006/0227916 A1* | 10/2006 | Masui | ............... | H03L 7/0995 375/355 |
| 2007/0195916 A1* | 8/2007 | Itahara | ............. | H03L 7/0994 375/376 |
| 2008/0114563 A1 | 5/2008 | Kappauf et al. | | |
| 2011/0064176 A1* | 3/2011 | Takada | ............. | H03L 7/07 375/355 |

FOREIGN PATENT DOCUMENTS

| | | |
|---|---|---|
| JP | 2007-36366 | 2/2007 |
| JP | 2009-147844 | 7/2009 |
| JP | 2009-543096 | 12/2009 |

* cited by examiner

*Primary Examiner* — Syed Haider
(74) *Attorney, Agent, or Firm* — Staas & Halsey LLP

(57) ABSTRACT

A transmission apparatus configured to extract reception data and a first clock from a received signal and transmit the reception data based on a second clock synchronized with the first clock, the transmission apparatus includes: a detector configured to detect a frequency difference between the first clock and the second clock; a selector configured to select parallel data according to the frequency difference from a plurality of parallel data obtained by shifting bit patterns formed by bits of continuing "0" and continuing "1" by different number of the bits with each other, and a converter configured to convert the parallel data selected by the selector into serial data so as to be the second clock.

8 Claims, 14 Drawing Sheets

BIT DATA TABLE

SERIAL DATA

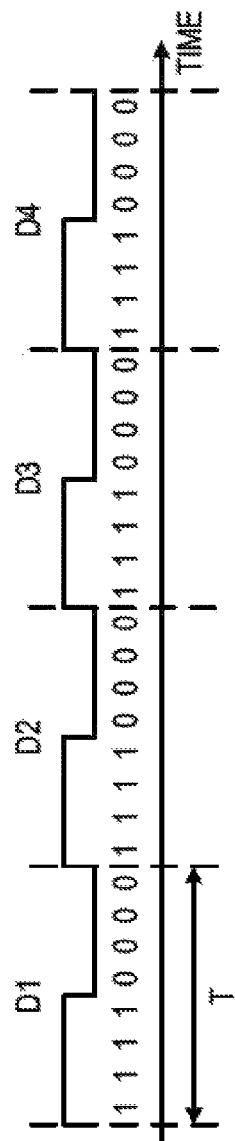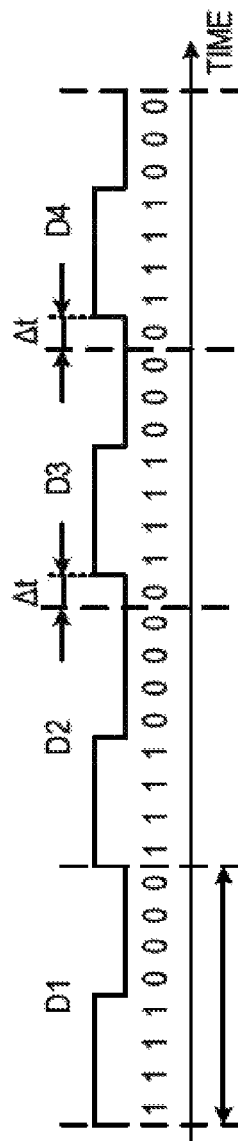

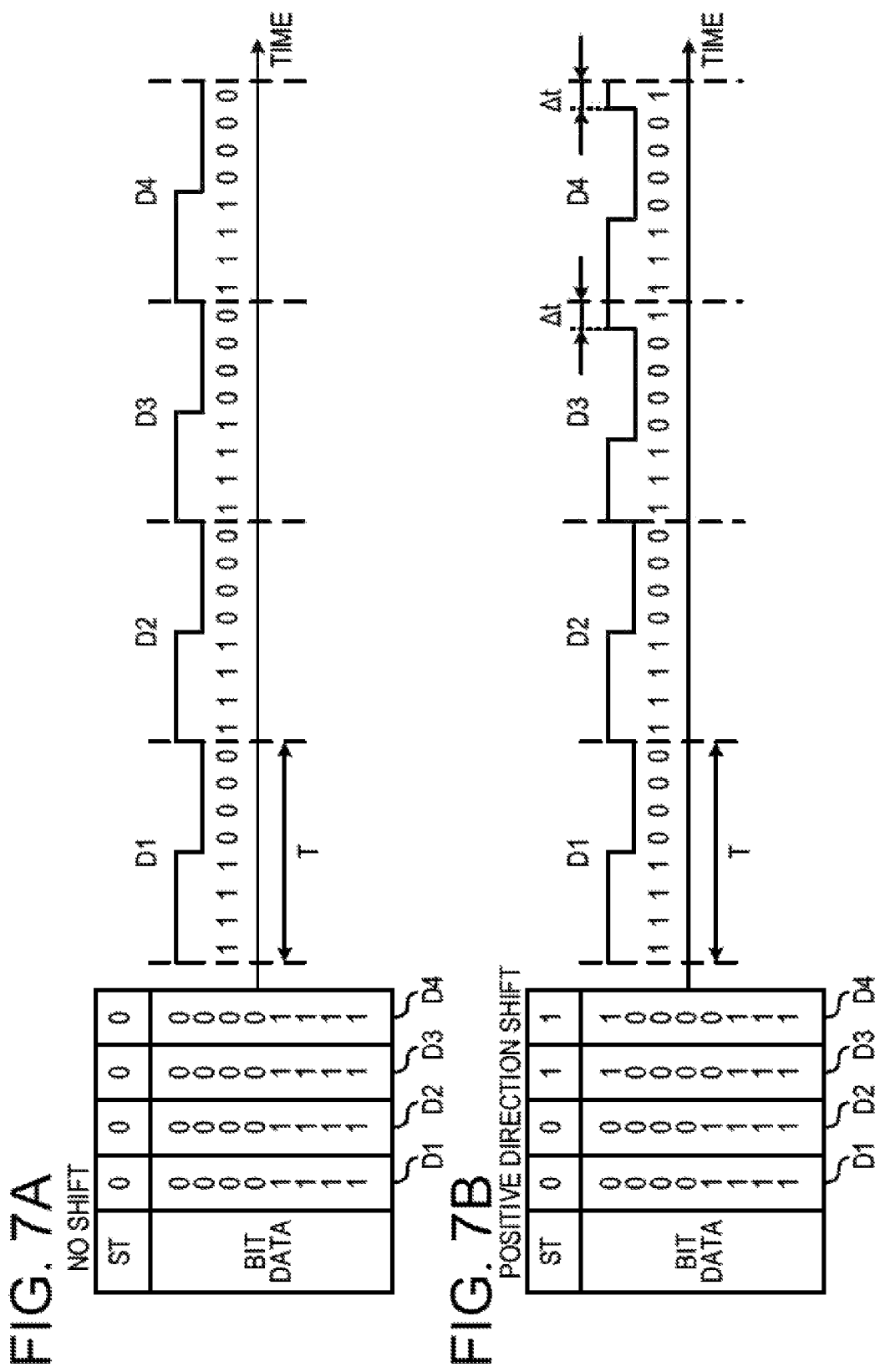

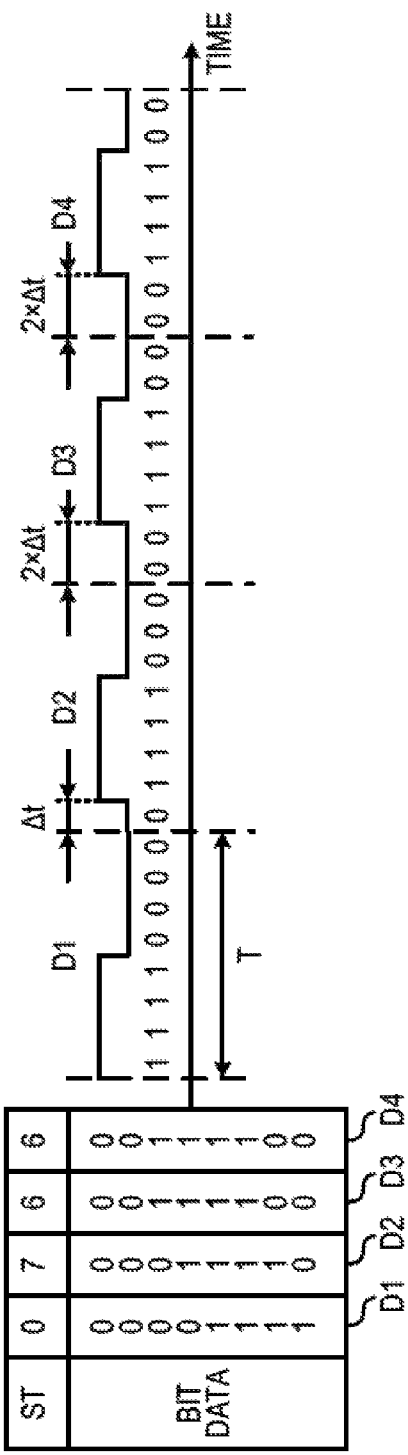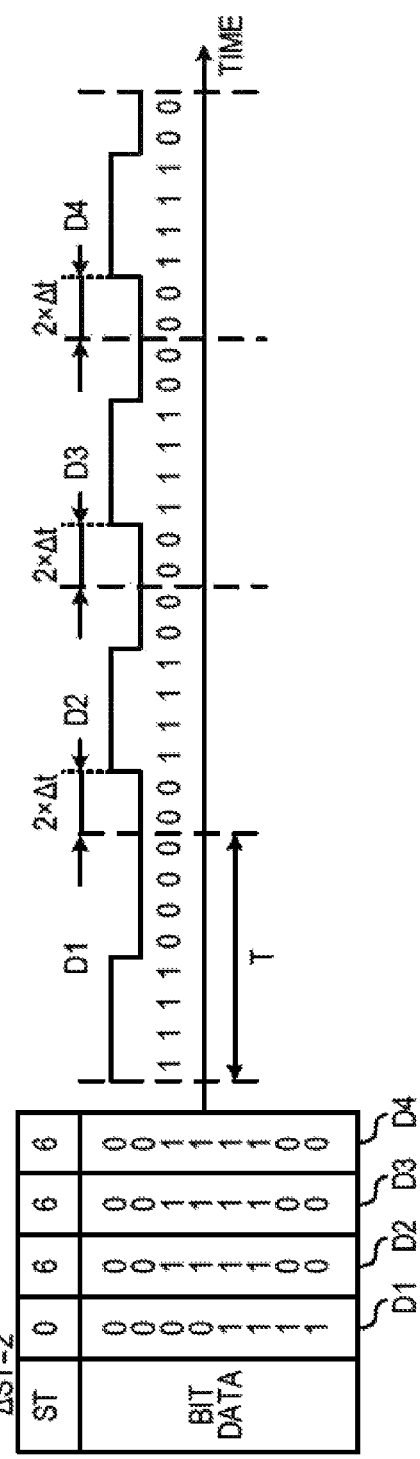

| ST | 0 | Xn-1<br>1 | Xn<br>2 | 3 | 4 | 5 | 6 | 7 |
|---|---|---|---|---|---|---|---|---|
| BIT DATA | 0<br>0<br>0<br>0<br>1<br>1<br>1<br>1 | 1<br>0<br>0<br>0<br>0<br>1<br>1<br>1 | 1<br>1<br>0<br>0<br>0<br>0<br>1<br>1 | 1<br>1<br>1<br>0<br>0<br>0<br>0<br>1 | 1<br>1<br>1<br>1<br>0<br>0<br>0<br>0 | 0<br>1<br>1<br>1<br>1<br>0<br>0<br>0 | 0<br>0<br>1<br>1<br>1<br>1<br>0<br>0 | 0<br>0<br>0<br>1<br>1<br>1<br>1<br>0 | i=0 ... i=7

| ST | 0 | Xn-1<br>1 | 2 | Xn<br>3 | 4 | 5 | 6 | 7 |
|---|---|---|---|---|---|---|---|---|
| BIT DATA | 0<br>0<br>0<br>0<br>1<br>1<br>1<br>1 | 1<br>0<br>0<br>0<br>0<br>1<br>1<br>1 | 1<br>1<br>0<br>0<br>0<br>0<br>1<br>1 | 1<br>1<br>1<br>0<br>0<br>0<br>0<br>1 | 1<br>1<br>1<br>1<br>0<br>0<br>0<br>0 | 0<br>1<br>1<br>1<br>1<br>0<br>0<br>0 | 0<br>0<br>1<br>1<br>1<br>1<br>0<br>0 | 0<br>0<br>0<br>1<br>1<br>1<br>1<br>0 | i=0 ... i=7

FIG. 14

| DATA WIDTH (bit) | DATA RATE (Gbps) | JITTER COMPONENT ||
| --- | --- | --- | --- |
| | | UI | FREQUENCY (kHz) |
| 8 | 1.24416 | 0.125 | 49.76 |
| 16 | 2.48832 | 0.0625 | 99.52 |
| 32 | 4.97664 | 0.03125 | 199.04 |
| 64 | 9.95328 | 0.015625 | 398.080 |

# TRANSMISSION APPARATUS AND CLOCK REGENERATION METHOD

CROSS-REFERENCE TO RELATED APPLICATION

This application is based upon and claims the benefit of priority from the prior Japanese Patent Application No. 2015-121541, filed on Jun. 16, 2015, the entire contents of which are incorporated herein by reference.

FIELD

The embodiments discussed herein are related to a transmission apparatus and a clock regeneration method.

BACKGROUND

There is a transmission apparatus for transmitting a signal equipped with a function of extracting data and a clock from a received signal. This type of transmission apparatus regenerates, from the extracted clock, a transmission clock that is synchronized with the extracted clock by a dedicated electronic component for processing the clock (hereinafter, a "component dedicated to clock") such as, for example, a digital phase locked loop (DPLL) or a jitter cleaner.

A related technique is disclosed in, for example, Japanese Laid-open Patent Publication No. 2007-036366.

SUMMARY

According to an aspect of the invention, a transmission apparatus configured to extract reception data and a first clock from a received signal and transmit the reception data based on a second clock synchronized with the first clock, the transmission apparatus includes: a detector configured to detect a frequency difference between the first clock and the second clock; a selector configured to select parallel data according to the frequency difference from a plurality of parallel data obtained by shifting bit patterns formed by bits of continuing "0" and continuing "1" by different number of the bits with each other, and a converter configured to convert the parallel data selected by the selector into serial data so as to be the second clock.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6A is a diagram illustrating an exemplary output of a reception clock signal in a case where the phase of the reception clock signal is not shifted;

FIG. 6B is a diagram illustrating an exemplary output of a reception clock signal in a case where the phase of the reception clock signal is shifted to a negative side;

FIG. 7A is a diagram illustrating an exemplary output of a reception clock signal in a case where the phase of the reception clock signal is not shifted;

FIG. 7B is a diagram illustrating an exemplary output of a reception clock signal in a case where the phase of the reception clock signal is shifted to a positive side;

FIG. 8A is a diagram illustrating an exemplary output of a clock signal in a case where $\Delta ST=1$;

FIG. 8B is a diagram illustrating an exemplary output of a clock signal in a case where $\Delta ST=2$;

FIG. 13A is a diagram illustrating an example of bit data inspection in a case where $\Delta ST=1$;

FIG. 13B is a diagram illustrating an example of bit data inspection in a case where $\Delta ST=2$; and FIG. 14 is a table illustrating an example of jitter component calculation.

DESCRIPTION OF EMBODIMENTS

Since the component dedicated to the clock has a complicated configuration, it is difficult to incorporate the component dedicated to the clock into a single chip electric component such as a field program gate array (FPGA). Accordingly, in the case of a transmission scheme that multiplexes signals of a plurality of lines, for example such as, a synchronous optical networking (SONET)/synchronous digital hierarchy (SDH) or an optical transport network (OTN), a transmission apparatus is required to be equipped with a component dedicated to clock for the lines separately from a chip component for signal processing and thus, the scale of the transmission apparatus is increased.

Hereinafter, an embodiment of a transmission apparatus and a clock regeneration method that are capable of regenerating a clock with a small scale configuration will be described with reference to the accompanying drawings.

Figure 1:
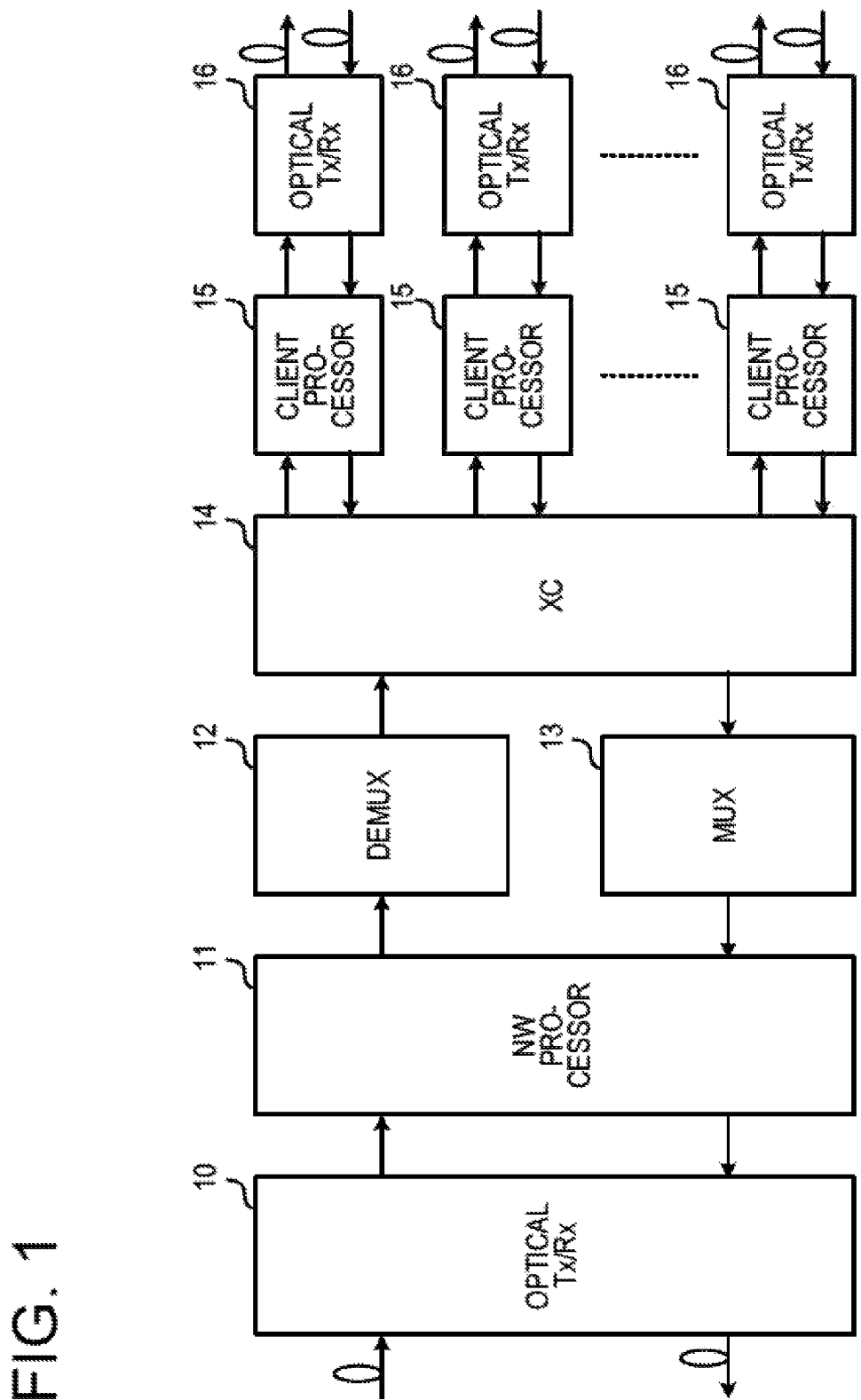
FIG. 1 is a block diagram illustrating an exemplary transmission apparatus.

FIG. 1 is a block diagram illustrating an exemplary transmission apparatus. In the present embodiment, while an OTN muxponder is exemplified as a transmission apparatus, the transmission apparatus is not limited thereto and may be any other kind of transmission apparatus. The OTN technology is defined in the International Telecommunication Union Telecommunication Standardization Sector (ITU-T) G.709 Recommendation.

The transmission apparatus includes a network side optical transmitter-receiver (Tx/Rx) 10, a network (NW) processor 11, a demultiplexer (DEMUX) 12, a multiplexer (MUX) 13, a cross-connection unit (XC) 14, a plurality of client processors 15, and a plurality of optical Tx/Rx 16. The network side optical Tx/Rx 10 transmits/receives optical signals to/from other transmission apparatuses through a network transmission path (e.g., an optical fiber). The network side optical Tx/Rx 10 includes, for example, an electro-optic conversion unit that converts an electrical signal to an optical signal and an opto-electric conversion unit that converts an optical signal into an electrical signal.

The NW processor 11 performs reception processing of an electrical signal input from the network side optical Tx/Rx 10 and outputs an electrical signal to the DEMUX 12 as an OTN frame. In addition, the NW processor 11 receives an OTN frame from the MUX 13 and performs transmission processing of the OTN frame so as to output the OTN frame to the network side optical Tx/Rx 10.

The DEMUX 12 acquires a plurality of optical data unit (ODU) frames from an optical channel transport unit (OTU) frame input from, for example, the NW processor 11, and outputs the ODU frames to the XC 14. The MUX 13 multiplexes the plurality of ODU frames input from the XC 14 so as to generate an OTU frame and outputs the OTU frame to the NW processor 11.

The XC 14 performs an exchange of an ODU frame between the DEMUX 12 and the MUX 13, and the plurality of client processors 15. More specifically, the XC 14 outputs an ODU frame input from the DEMUX 12 to a client processor 15 that corresponds to a reception destination. The XC 14 outputs an ODU frame input from the client processor 15 to the MUX 13.

The client processor 15 performs reception processing of a client signal input from the optical Tx/Rx 16 so as to output the client signal to the XC 14 as an ODU frame. The client processor 15 performs transmission processing of the ODU frame input from the XC 14 so as to output the ODU frame to the optical Tx/Rx 16 as a client signal.

The optical Tx/Rx 16 converts the client signal input from the client processor 15 into an optical signal and transmits the optical signal to the client side network. The optical Tx/Rx 16 converts the client signal input from the client side network into an electrical signal and outputs the electrical signal to the client processor 15.

Figure 2:
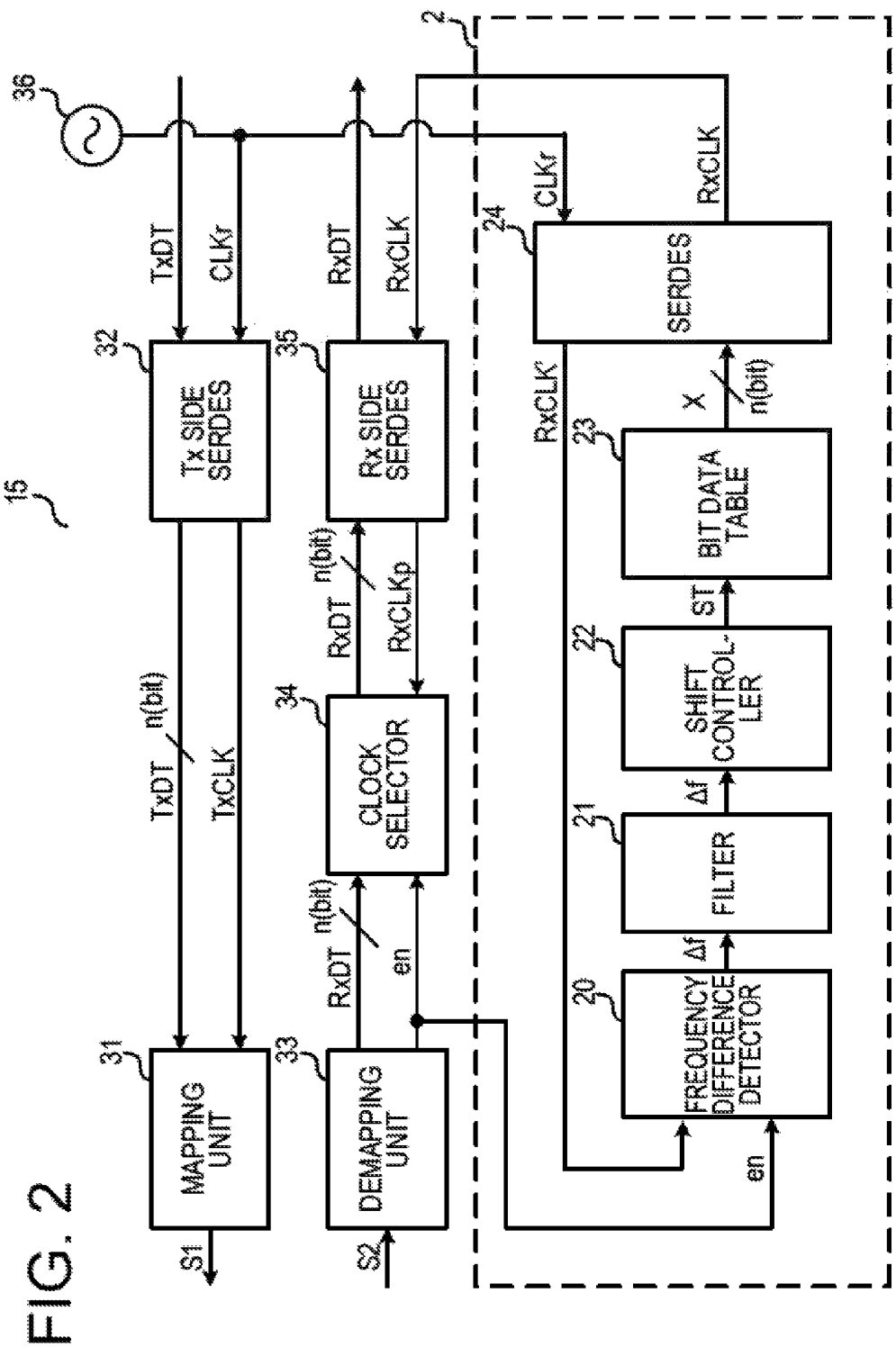
FIG. 2 is a block diagram illustrating an exemplary client processor.

FIG. 2 is a block diagram illustrating an exemplary client processor 15. The client processor 15 includes a mapping unit 31, a Tx side serializer/deserializer (SERDES) 32, a demapping unit 33, a clock selector 34, an Rx side SERDES 35, an oscillator 36, and a clock synchronizer 2.

The oscillator 36 is, for example, a crystal oscillator, and generates a reference clock signal CLKr and outputs the reference clock signal CLKr to the Tx side SERDES 32 and the clock synchronizer 2. The Tx side SERDES 32 converts transmission data TxDT of a client signal input from the optical Tx/Rx 16 from serial data to parallel data of n-bit width based on the reference clock signal CLKr and outputs the TxDT to the mapping unit 31. The Tx side SERDES 32 divides the frequency of the reference clock signal CLKr by n so as to generate a transmission clock signal TxCLK that is synchronized with the transmission data TxDT, and output the transmission clock signal TxCLK to the mapping unit 31.

The mapping unit 31 receives the transmission data TxDT of the parallel data based on the transmission clock signal TxCLK. The mapping unit 31 maps the transmission data TxDT to an ODU frame S1 and outputs the ODU frame S1 to the XC 14 as a transmission signal.

The demapping unit 33 receives an ODU frame S2 from the XC 14 and performs demapping processing of the ODU frame S2. Accordingly, the demapping unit 33 extracts reception data RxDT and a clock component en from the ODU frame S2. The clock component en is extracted based on a justification control (JC) within an optical channel payload unit (OPU) overhead. The clock component en is an example of a first clock.

The demapping unit 33 outputs the reception data RxDT and the clock component en of the ODU frame to the clock selector 34. The reception data RxDT are output to the clock selector 34 as n-bit parallel data. The clock component en is input to the clock synchronizer 2.

The clock synchronizer 2 outputs a reception clock signal RxCLK which is synchronized with the clock component en to the Rx side SERDES 35. More specifically, the clock synchronizer 2 synchronizes a reference clock signal CLKr input from the oscillator 36 with the clock component en and outputs the reference clock signal CLKr as the reception clock signal RxCLK. The clock signal RxCLK is an example of a second clock.

The Rx side SERDES 35 converts the reception data RxDT which is parallel data input from the clock selector 34 into serial data based on the reception clock signal RxCLK and outputs the RxDT to the optical Tx/Rx 16. That is, the Rx side SERDES 35 generates the reception data RxDT based on the reception clock signal RxCLK.

Further, the Rx side SERDES 35 divides the frequency of the reception clock signal RxCLK by n so as to generate a parallel reception clock signal RxCLKp synchronized with the reception data RxDT which is parallel data and output the RxCLKp to the clock selector 34. The clock selector 34 switches the transmission clock of the reception data RxDT from the clock component en to the parallel reception clock signal RxCLKp and outputs the reception data RxDT to the Rx side SERDES 35.

As described above, the transmission apparatus extracts the reception data RxDT and the clock component en from the received signal S2 and generates the reception data RxDT based on the reception clock signal RxCLK which is synchronized with the clock component en. In the meantime, in the present embodiment, the clock component en is extracted from the JC. However, in the case of a SONET/SDH transmission apparatus, the clock component en is extracted from pointer justification (PJ) and, in the case of a stuff multiplex transmission apparatus, the clock component en is extracted from the Staff Bit.

The clock synchronizer 2 synchronizes the reference clock signal CLKr with the clock component en so as to regenerate the reception clock signal RxCLK. For example, in a case where the clock synchronizer 2 performs synchronization by using the component dedicated to clock such as the DPLL or the jitter cleaner, the transmission apparatus is required to be equipped with the component dedicated to clock for the client signal, separately from a chip component for signal processing and thus, the scale of the transmission apparatus is increased.

Accordingly, the clock synchronizer 2 converts parallel data into serial data by the SERDES without using the component dedicated to clock so as to regenerate the reception clock signal RxCLK with a small scale configuration as will be described below. More specifically, the clock synchronizer 2 includes a frequency difference detector 20, a filter 21, a shift controller 22, a bit data table 23, and a SERDES 24.

The frequency difference detector 20 is an example of a detector and detects a frequency difference Δf between the clock component en and the reception clock signal RxCLK'. The reception clock signal RxCLK' is the same signal as the reception clock signal RxCLK generated based on the reference clock signal CLKr, and is output from the SERDES 24 to the frequency difference detector 20. The filter 21 is, for example, a finite impulse response (FIR) filter or an infinite impulse response (IIR) filter, and removes a noise component of the frequency difference Δf by smoothing the frequency difference Δf. When the noise component of the frequency difference Δf is sufficiently small, the filter 21 may not be provided.

The shift controller 22 is an example of a selector, and selects bit data X according to the frequency difference Δf from a plurality of bit data within the bit data table 23 and outputs the bit data X to the SERDES 24. The bit data X is an example of parallel data and has an n-bit width. The shift controller 22 determines a shift direction and a shift amount of the phase of the reception clock signal RxCLK according to the frequency difference Δf and outputs a control value ST according to the determination to the bit data table 23.

In the bit data table 23, a plurality of bit data, which are obtained by shifting the bit patterns where "0s" and "1s" (binary digits) are respectively continued by different number of bits, respectively, are maintained. The bit data table 23 outputs the selected bit data X according to the control value ST input from the shift controller 22 to the SERDES 24. In the meantime, the bit data table 23 is formed by, for example, a random access memory (RAM).

The SERDES 24 is an example of a converter, and converts the bit data X selected by the shift controller 22 into serial data and outputs the bit data X to the Rx side SERDES 35 as the reception clock signal RxCLK.

Accordingly, the clock synchronizer 2 selects the bit data X according to the frequency difference Δf between the reception clock signal RxCLK and the clock component en and converts the selected bit data X to the serial data so as to regenerate the reception clock signal RxCLK. In this case, since the bit data X is selected from the plurality of bit data, which are obtained by shifting the bit patterns where "0s" and "1s" are respectively continued by different number of bits, respectively, the phase of the reception clock signal RxCLK is shifted according to the selection.

Therefore, the frequency of the reception clock signal RxCLK may be coincident with that of the clock component en so that the reception clock signal RxCLK and the clock component en may be synchronized with each other. Thus, the clock synchronizer 2 may regenerate the reception clock signal RxCLK with a small scale configuration without using the component dedicated to clock. In the following, the clock synchronizer 2 will be described in detail.

Figure 3:
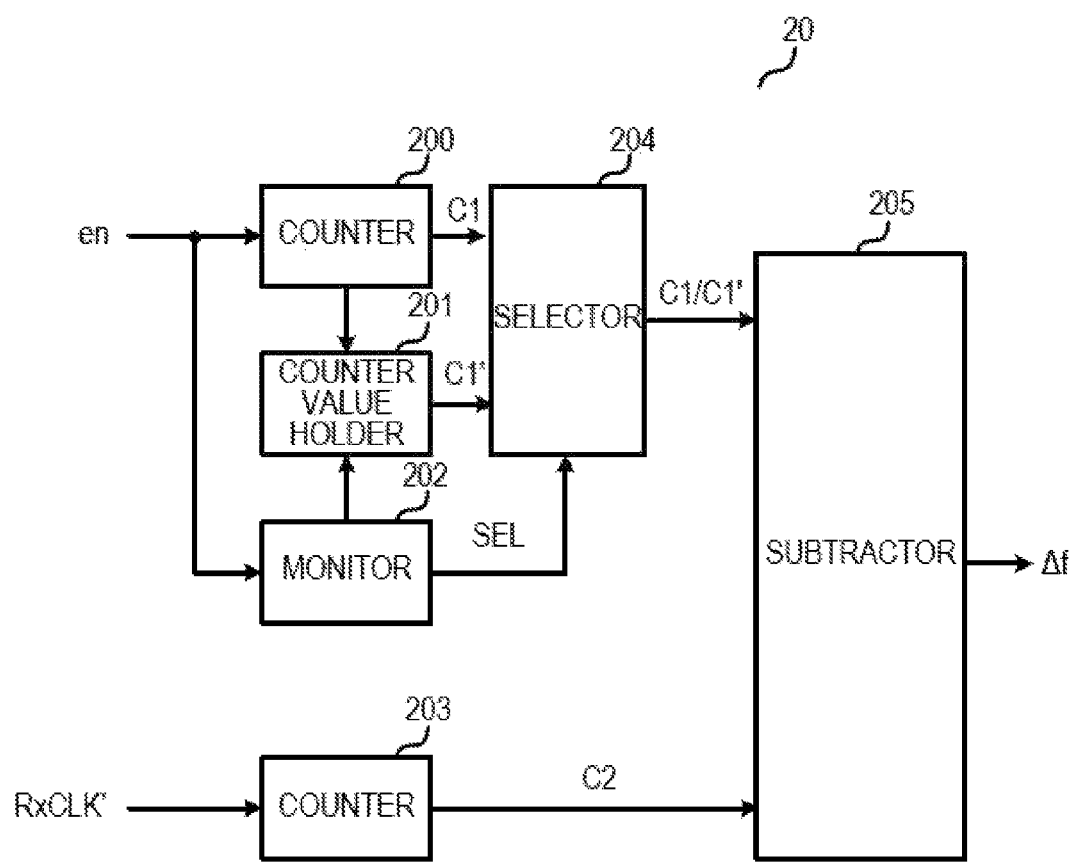
FIG. 3 is a block diagram illustrating an exemplary frequency difference detector.

FIG. 3 is a block diagram illustrating an exemplary frequency difference detector 20. The frequency difference detector 20 includes counters 200 and 203, a counter value holder 201, a monitor 202, a selector 204, and a subtractor 205.

The counter 200 is an example of the first counter, and performs a count operation in synchronization with the clock component en. More specifically, a counter value C1 counted by the counter 200 is the number of clocks of the clock component en for each predetermined period of time. The counter value holder 201 is, for example, a memory, and maintains the counter value C1 (hereinafter, C1') of the counter 200 according to the instruction of the monitor 202.

The selector 204 selects either the counter value C1 of the counter 200 or the counter value C1' maintained in the counter value holder 201 based on a selection signal SEL input from the monitor 202 and outputs the selected counter value to the subtractor 205.

The monitor 202 monitors an input interruption of the clock component en and an abnormality in the period of the clock component en, and instructs the counter value holder 201 to maintain the counter value for each monitoring period. In a case where the clock component en is in a normal state, the monitor 202 outputs the selection signal SEL such that the counter value C1 of the counter 200 is selected, and in a case where the clock component en is in an abnormal state, the monitor 202 outputs the selection signal SEL such that the counter value C1' of the counter value holder 201 is selected.

In the meantime, the counter 203 is an example of the second counter, and performs the count operation in synchronization with the reception clock signal RxCLK'. More specifically, a counter value C2 counted by the counter 203 is the number of clocks of the reception clock signal RxCLK' for each predetermined period of time.

The subtractor 205 subtracts the counter values C1 and C1' output from selector 204 from the counter value C2 of the counter 203, and outputs the result as the frequency difference Δf. That is, the subtractor 205 calculates a difference between the counter value (the number of clocks) C1 of the counter 200 and the counter value C2 of the counter 203 to detect the frequency difference Δf. Therefore, the frequency difference detector 20 may detect the frequency difference Δf with a simple configuration.

In a case where the clock component en is abnormal, the monitor 202 outputs the counter value C1' maintained in the counter value holder 201 to the subtractor 205. Accordingly, even when the clock component en is abnormal, the frequency difference detector 20 may continuously detect the frequency difference Δf using the counter value C1' before the clock component becomes abnormal.

Figures 4A, 4B:
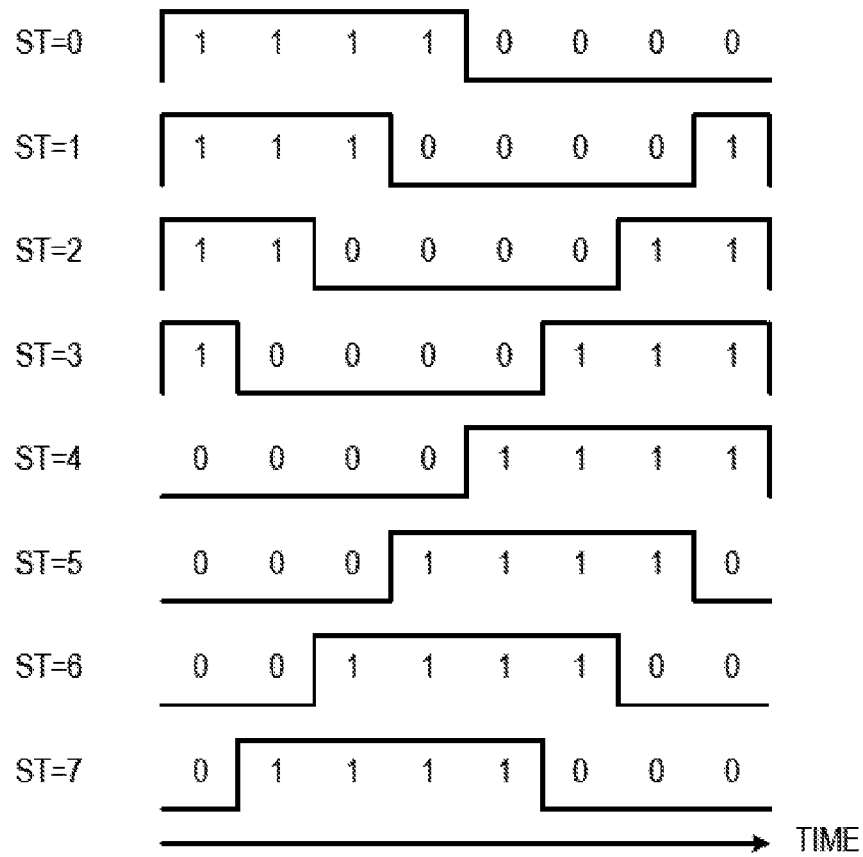
FIG. 4A is a diagram illustrating an exemplary bit data table.
FIG. 4B is a diagram illustrating exemplary output bit data subjected to serial conversion.

FIG. 4A illustrates an exemplary bit data table 23. Seven kinds of bit data corresponding to control values ST (that correspond to 0, 1, 2 . . . 7) are maintained in the bit data table 23. Each bit data is parallel data of an 8-bit width, for example. The bit data table 23 outputs the bit data according to the control value ST input from the shift controller 22 to the SERDES 24. In the meantime, an output sequence of the bit data is represented by an arrow in FIG. 4A.

The bit data of the control value ST=0 is constituted with continuous four "0s" and continuous four "1s." The bit data of the control value ST=1 is obtained by shifting the bit data of the control value ST=0 to the higher side (bit side which has the earliest output sequence) by 1 bit and the bit data of the control value ST=2 is obtained by shifting the bit data of the control value ST=0 to the higher side by 2 bits. The bit data of the control values ST=3 to 7 are obtained by shifting the bit data of the control value ST=0 to the higher side by 3 bits to 7 bits, respectively.

Further, in a case where the shift direction is reversed, the bit data of the control value ST=7 is obtained by shifting the bit data of the control value ST=0 to the lower side (bit side which has the latest output sequence) by 1 bit and the bit data of the control value ST=6 is obtained by shifting the bit data of the control value ST=0 to the lower side by 2 bits. The bit data of the control values ST=5 to 1 are obtained by shifting the bit data of the control value ST=0 to the lower side by 3 bits to 7 bits, respectively.

As described above, since the bit data, which are obtained by shifting the bit patterns where "0s" and "1s" are respectively continued by 1 bit, respectively, are maintained in the bit data table 23, the control values ST are adjusted so as to adjust the phase of the reception clock signal RxCLK constituted with the serial data (that is, bit stream) output from the SERDES 24.

FIG. 4B illustrates an exemplary serial data. The serial data are represented for respective cases where the control values ST=0 to 7.

Referring to the serial data in the case where ST=0, the bit data X includes 4-bit of "0s" and 4-bit of "1s" and thus, the duty ratio of the reception clock signal RxCLK is 50(%). Further, the serial data in the case of other control values ST are respectively obtained by shifting the serial data for the case where ST=0 by 1. Therefore, the shift controller 22 may shift the phase of the reception clock signal RxCLK according to the control value ST.

The shift controller 22 may change the control value ST to the positive side of the shift direction in FIG. 4A (direction orienting from ST=0 to ST=7 and direction switching from ST=7 to ST=0) so as to advance the phase of the reception clock signal RxCLK. Further, the shift controller 22 may change the control value ST to the negative side of the shift direction (direction orienting from ST=7 to ST=0 and direction switching from ST=0 to ST=7) so as to delay the phase of the reception clock signal RxCLK. Hereinafter, descriptions will be made on a phase adjustment of the reception clock signal RxCLK.

Figure 5:
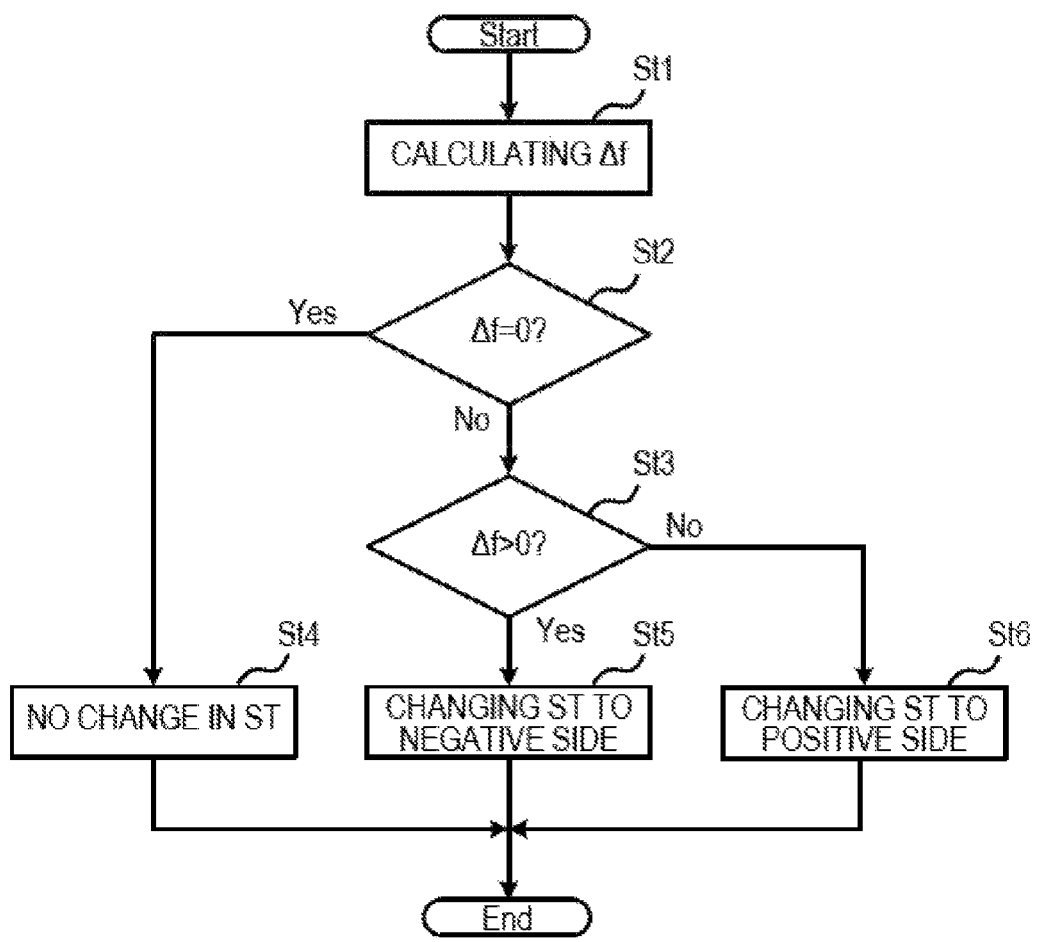
FIG. 5 is a flowchart illustrating an exemplary clock phase adjustment process.

FIG. 5 is a flowchart illustrating an exemplary clock phase adjustment process. The clock phase adjustment process is repeatedly performed at predetermined time intervals.

The frequency difference detector 20 detects the frequency difference $\Delta f$ between the clock component en and the reception clock signal RxCLK' (Operation St1). Next, the shift controller 22 determines whether the frequency difference $\Delta f$ is 0 (zero) (Operation St2). When it is determined that the frequency difference $\Delta f$ is 0 ("YES" at Operation St2), the shift controller 22 does not change the control value ST since the clock component en is in synchronization with the reception clock signal RxCLK (Operation St4).

That is, when there is no frequency difference $\Delta f$ ($\Delta f=0$), the shift controller 22 keeps selecting the bit data X. Accordingly, the state where the clock component en is synchronized with the reception clock signal RxCLK (frequency matching) is maintained.

When it is determined that the frequency difference $\Delta f$ is not 0 (zero) ("NO" at Operation St2), the shift controller 22 determines whether the frequency difference $\Delta f$ is greater than 0 (that is, whether it is either positive or negative) (Operation St3). When it is determined that the frequency difference $\Delta f$ is positive ("YES" at Operation St3), the shift controller 22 changes the control value ST to the negative side of the shift direction (Operation St5).

FIGS. 6A and 6B illustrate an example where the control value ST is changed to the negative side of the shift direction. FIG. 6A illustrates an exemplary output of a reception clock signal in a case where the phase of the reception clock signal is not shifted and FIG. 6B illustrates an exemplary output of a reception clock signal in a case where the phase of the reception clock signal is shifted to the negative side.

In the present example, the bit data D1, D2, D3, and D4 are output to the SERDES 24 in this order and the SERDES 24 sequentially converts the bit data D1, D2, D3, and D4 into the serial data based on the reference clock signal CLKr and outputs the bit data D1, D2, D3, and D4 as the reception clock signal RxCLK. When the phase is not shifted, the shift controller 22 outputs the bit data D1, D2, D3, and D4 of ST=0 as illustrated in FIG. 6A. Accordingly, the SERDES 24 outputs the reception clock signal RxCLK having a pulse width between rising and falling edges equivalent to a time width T of a single clock.

In the meantime, when the phase is shifted to the negative side, as illustrated in FIG. 6B, the shift controller 22 sequentially outputs the bit data D1 and D2 of ST=0 and the bit data D3 and D4 of ST=7. Therefore, when the SERDES 24 outputs the bit data D3 and D4 as the serial data, the SERDES 24 outputs the reception clock signal RxCLK having rising and falling edges deviated from a time width T of a single clock by $\Delta t$ in time. Here, the time $\Delta t$ corresponds to one-eighth of the time width T of a single clock.

That is, the SERDES 24 outputs the reception clock signal RxCLK delayed by ⅛ clock, compared to the case of FIG. 6A. Accordingly, the shift controller 22 shifts the phase of the reception clock signal RxCLK to the negative side.

Referring back to FIG. 5 again, when it is determined that the frequency difference $\Delta f$ is negative ("NO" at Operation St3), the shift controller 22 changes the control value ST to the positive side of the shift direction (Operation St6). The clock phase adjustment process is performed as described above.

FIGS. 7A and 7B illustrate examples where the control value ST is changed to the positive side of the shift direction. FIG. 7A illustrates an exemplary output of a reception clock signal in a case where the phase of the reception clock signal is not shifted, and FIG. 7B illustrates an exemplary output of a reception clock signal in a case where the phase of the reception clock signal is shifted to a positive side. Since FIG. 7A is the same as FIG. 6A, descriptions thereof will be omitted.

When the phase is shifted to the positive side, the shift controller 22 sequentially outputs the bit data D1 and D2 of ST=0 and the bit data D3 and D4 of ST=1 as illustrated in FIG. 7B. Accordingly, when the SERDES 24 outputs the bit data D3 and D4 as the serial data, the SERDES 24 outputs the reception clock signal RxCLK having rising and falling edges deviated from the time width T of a single clock by time $\Delta t$.

That is, the SERDES 24 outputs the reception clock signal RxCLK advanced by ⅛ clock, compared to the case of FIG. 7A. Accordingly, the shift controller 22 shifts the phase of the reception clock signal RxCLK to the positive side.

In the present embodiment, since the bit data is the parallel data having an 8-bit width, the phase of the reception clock signal RxCLK is adjusted with unit time $\Delta t$ of ⅛ clock, but when the width of the bit data is increased, resolution may be enhanced. For example, when the width of the bit data is set to 16-bit, the phase of the reception clock signal RxCLK is adjusted with unit time $\Delta t$ of 1/16 clock.

However, when the width of the bit data is increased, a time required for synchronizing the clock component en with the reception clock signal RxCLK is increased. Accordingly, the shift controller 22 determines the amount of phase shift according to the frequency difference $\Delta f$. For example, the shift controller 22 changes the control value ST one by one as illustrated in the examples of FIGS. 6A to 7B when the frequency difference $\Delta f$ is less than a predetermined threshold value TH, while the shift controller 22 changes the control value ST two by two when the frequency difference $\Delta f$ is less than the predetermined threshold value TH. That is, the shift controller 22 selects the variation $\Delta ST$ of the control value ST according to the frequency difference $\Delta f$.

FIG. 8A illustrates an exemplary output of a clock signal in a case where $\Delta ST=1$, and FIG. 8B illustrates an exemplary output of a clock signal in a case where $\Delta ST=2$. In the present example, it is assumed that the phase of the reception clock signal RxCLK needs to be delayed by $2\times\Delta t$, that is, 1/16 clock, in order to synchronize with the clock component en.

In the case where $\Delta ST=1$, as illustrated in FIG. 8A, the shift controller 22 sequentially outputs the bit data D1 of ST=0, the bit data D2 of ST=7, and the bit data D3 and D4 of ST=6. Accordingly, when the SERDES 24 outputs the bit data D2 as the serial data, the SERDES 24 outputs the reception clock signal RxCLK delayed by ⅛ clock ($\Delta t$), and when the SERDES 24 outputs the bit data D3 as the serial data, the SERDES 24 outputs the reception clock signal RxCLK delayed by 1/16 clock (2×Δt).

Accordingly, the shift controller 22 is required to output the control value ST twice for the synchronization processing of the reception clock signal RxCLK. Thus, a time required for the synchronization processing of the reception clock signal RxCLK becomes 2×T.

In the meantime, in the case where ΔST=2, as illustrated in FIG. 8B, the shift controller 22 sequentially outputs the bit data D1 of ST=0 and the bit data D2, D3, and D4 of ST=6. Thus, when the SERDES 24 outputs the bit data D2 as the serial data, the SERDES 24 outputs the reception clock signal RxCLK delayed by 1/16 clock (2×Δt).

Accordingly, the shift controller 22 may perform the synchronization processing for the reception clock signal RxCLK by only outputting the control value ST once. Thus, the time required for the synchronization processing of the reception clock signal RxCLK becomes T and thus, is reduced to ½ of the time required for a case of ΔST=1.

As described above, when the frequency difference Δf is equal to or larger than the predetermined threshold value TH, the shift controller 22 selects the bit data X such that the phase of the reception clock signal RxCLK is shifted with a larger scale than that in a case where the frequency difference Δf is less than the predetermined threshold value TH. Accordingly, the time required for the synchronization processing for the reception clock signal RxCLK is reduced.

Figure 9:
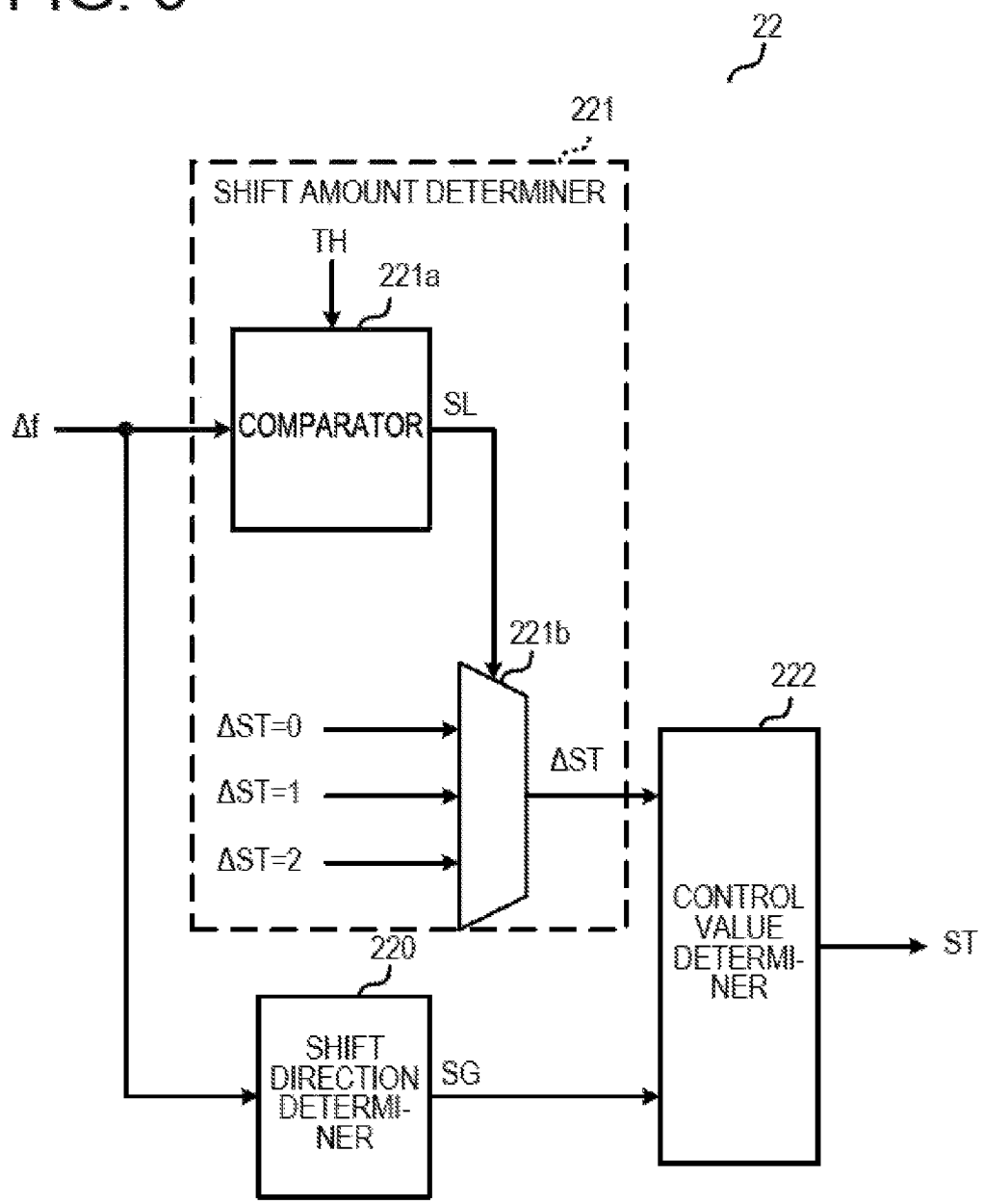
FIG. 9 is a block diagram illustrating an exemplary shift controller.

FIG. 9 is a block diagram illustrating a shift controller 22. The shift controller 22 includes a shift direction determiner 220, a shift amount determiner 221, and a control value determiner 222. The shift amount determiner 221 includes a comparator 221a and a selector 221b.

As described above with reference to FIG. 5, the shift direction determiner 220 determines a control direction SG (positive side or negative side) of the control value ST based on the frequency difference Δf and outputs the determination result to the control value determiner 222. The comparator 221a compares the frequency difference Δf with the threshold value TH and outputs a comparison result SL to the selector 221b. The selector 221b selects the ΔST according to the comparison result SL from the variation of the control value ST, ΔST=0 to 2, and outputs the selected ΔST to the control value determiner 222. The control value determiner 222 determines the control value ST from the variation ΔST and the control direction SG of the control value ST and outputs the control value ST to the bit data table 23.

Figure 10:
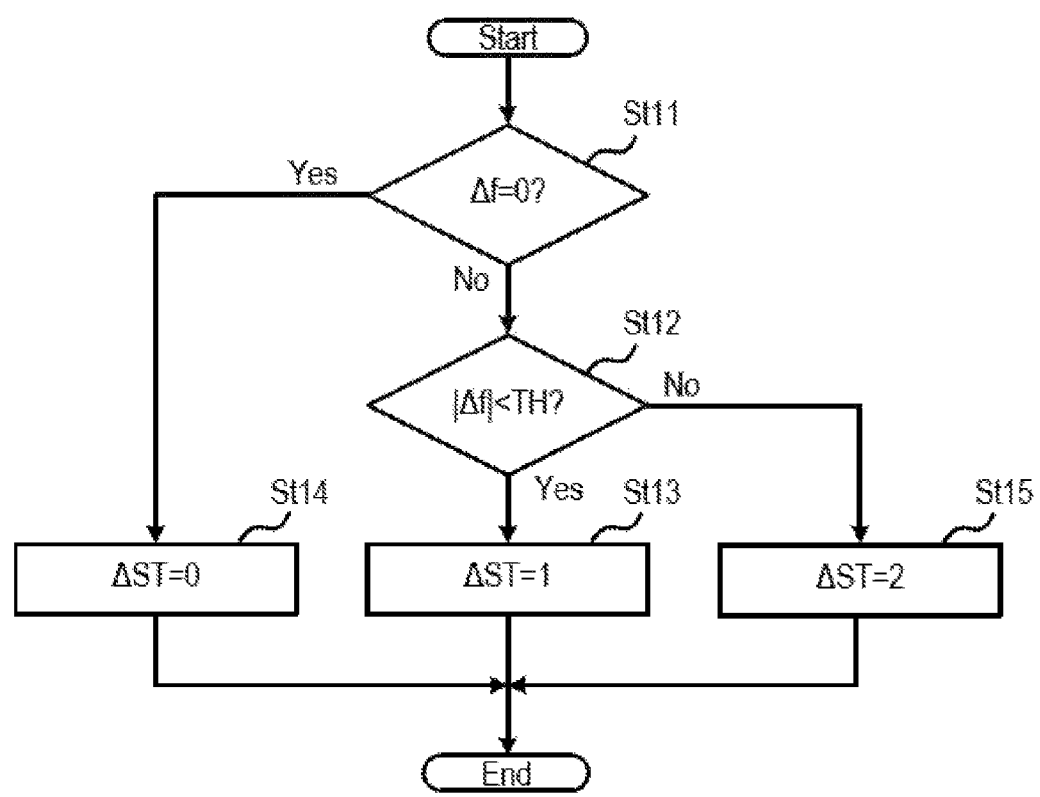
FIG. 10 is a flowchart illustrating an exemplary determination processing of the variation of a control value.

FIG. 10 is a flowchart illustrating an example of a determination process of the variation of the control value ST. The determination process is performed at intervals of a predetermined period, for example.

The shift amount determiner 221 determines whether the frequency difference Δf is 0 (zero) (Operation St11). When it is determined that the frequency difference Δf is 0 ("YES" at Operation St11), the shift amount determiner 221 sets the variation ΔST of the control value ST to 0, that is, ΔST=0 (Operation St14). In this case, since the clock component en is in synchronization with the reception clock signal RxCLK, the shift controller 22 maintains the control value ST.

When it is determined that the frequency difference Δf is not 0 (zero) ("NO" at Operation St11), the shift amount determiner 221 compares an absolute value |Δf| of the frequency difference Δf with the predetermined threshold value TH (Operation St12). When it is determined that the absolute value of the frequency difference Δf is less than the predetermined threshold value TH ("YES" at Operation St12), the shift amount determiner 221 sets the variation ΔST of the control value ST to 1 (one), that is, ΔST=1 (Operation St13). Therefore, for example, in a case where the clock component en and the reception clock signal RxCLK are turned into an asynchronous state from a synchronous state due to an influence from some other factors, the reception clock signal RxCLK may be generated having the jitter characteristics sufficient for maintaining the transmission performance.

When it is determined that the absolute value of the frequency difference Δf is equal to or larger than the predetermined threshold value TH ("NO" at Operation St12), the shift amount determiner 221 sets the variation ΔST of the control value ST to 2, that is, ΔST=2 (Operation St15). Therefore, for example, in a case where the clock component en and the reception clock signal RxCLK are in the asynchronous state right after the clock interruption or the clock switching, the synchronous state may be rapidly established. As described above, the determination process of the variation of the control value ST is performed.

Figure 11:
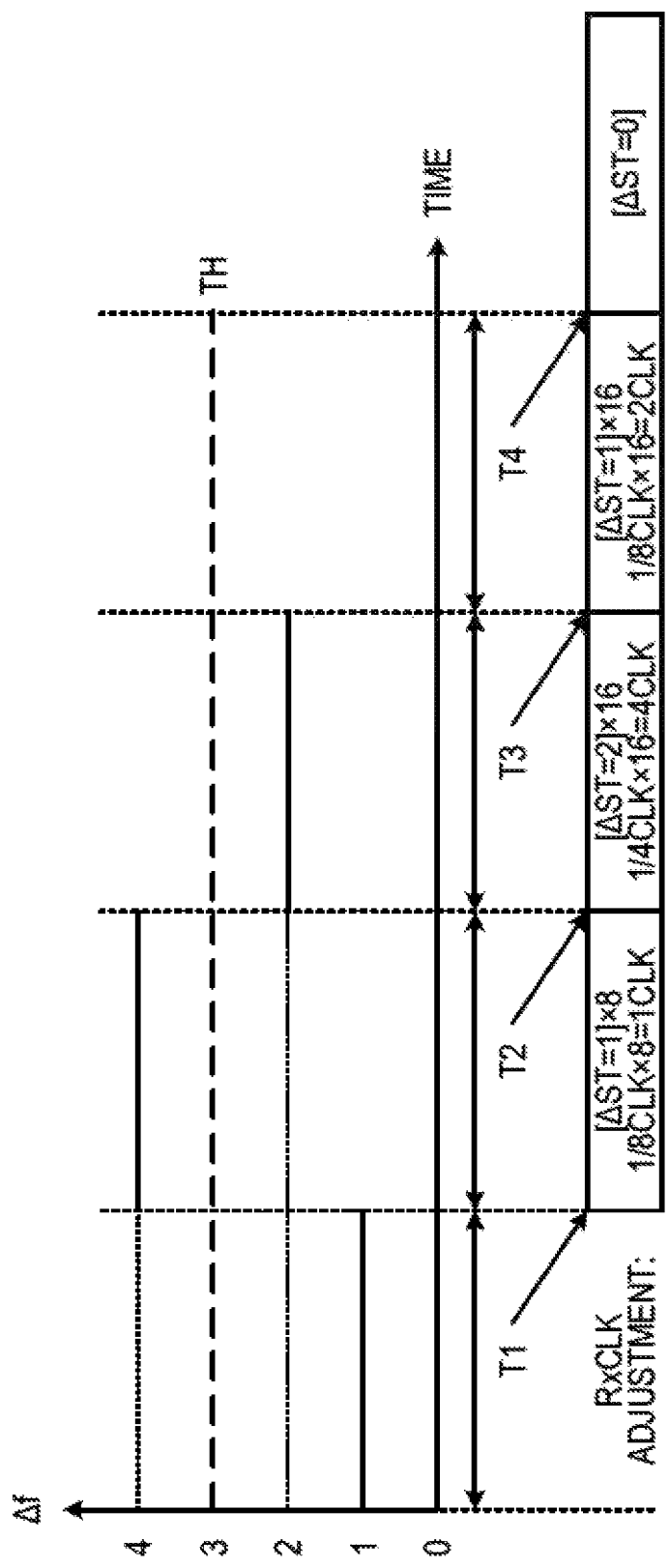
FIG. 11 is a diagram illustrating an example of clock phase adjustment.

FIG. 11 is a diagram illustrating an example of clock phase adjustment. In FIG. 11, the horizontal axis indicates a time and the vertical axis indicates a frequency difference Δf detected during time periods of T1 to T4. In the present example, it is assumed that the frequency difference Δf is 1 during the time period T1, 4 during the time period T2, 2 during the time period T3, and 0 during the time period T4. Further, the threshold value TH is assumed to be 3.

In the time period T1, the frequency difference Δf of 1 (that is, Δf=1) is smaller than the threshold value TH of 3. Accordingly, the shift controller 22 performs an outputting of the control value ST of eight times by setting the variation of ΔST=1 in the next time period T2. Accordingly, the phase is shifted by ⅛ clock×8 times=1 clock according to the frequency difference Δf of 1.

In the time period T2, the frequency difference Δf of 4 is larger than the threshold value TH of 3. Accordingly, the shift controller 22 performs an outputting of the control value ST of sixteen times by setting the variation of ΔST=2 in the next time period T3. Accordingly, the phase is shifted by ¼ clock×16 times=4 clocks according to the frequency difference Δf of 4.

In the time period T3, the frequency difference Δf of 2 is smaller than the threshold value TH of 3. Accordingly, the shift controller 22 performs an outputting of the control value ST of sixteen times with setting the variation of ΔST=1 in the next time period T4. Accordingly, the phase is shifted by ⅛ clock×16 times=2 clocks according to the frequency difference Δf of 2.

In the time period T4, since the frequency difference Δf is 0, the clock component en is synchronization with the reception clock signal RxCLK. Accordingly, in the time period after the time period T4, the shift controller 22 maintains the current control value ST and thus, the variation ΔST is 0. Accordingly, there is no clock phase shift.

As described above, the shift controller 22 may determine the threshold value TH and the variation ΔST of the control value ST according to following characteristics of the reception clock signal RxCLK for the clock component en and synchronize the clock component en with the reception clock signal RxCLK. In the meantime, in the present example, since the clock phase is controlled from the first time period T1, the reception clock signal RxCLK is made to follow the clock component en at a higher speed, but is not limited thereto, and may be made to follow more gradually than the present example.

The bit data table 23 may be configured by a logic circuit, but is preferably configured by the RAM from the viewpoint of circuit scale. In this case, there is a possibility that a bit error occurs in the bit data X read from the bit data table 23 and thus, a bit error detection module and correction module may be installed.

Figure 12:
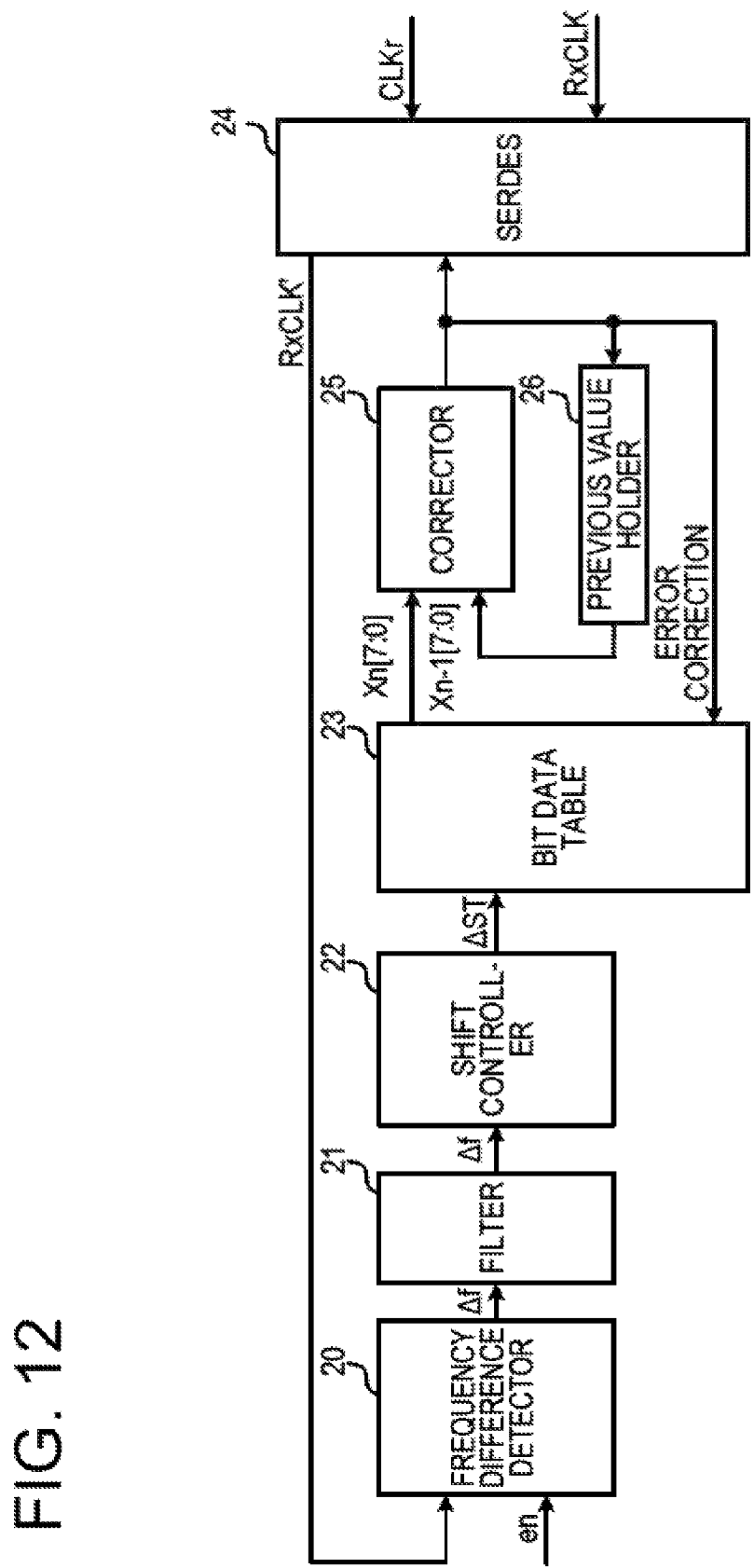
FIG. 12 is a block diagram illustrating another exemplary client processor.

FIG. 12 is a block diagram illustrating another exemplary client processor 15. More specifically, FIG. 12 illustrates the clock synchronizer 2. In FIG. 12, the same constitutional components as those of FIG. 2 are denoted by the same reference numerals, and descriptions thereof will be omitted.

The clock synchronizer 2 includes a frequency difference detector 20, a filter 21, a shift controller 22, a bit data table 23, a SERDES 24, a corrector 25, and a previous value holder 26. The corrector 25 is an example of a correction unit, and compares the bit data Xn[7:0] output from the bit data table 23 with previous bit data Xn−1[7:0] held in a previous value holder so as to detect and correct the error of the bit data Xn[7:0].

The corrector 25 outputs the corrected bit data X to the previous value holder 26 and the bit data table 23. The previous value holder 26 holds the output bit data X and outputs the bit data X to the corrector 25 as the previous bit data Xn−1 [7:0]. When the bit error is present in the bit data, the bit data table 23 modifies the bit data based on the bit data X output from the corrector 25.

The corrector 25 may perform a bit error correction by an error checking and correction (ECC) but, performs the bit error correction based on the regularity of the bit data X in order to reduce an amount of data processing. Accordingly, the corrector 25 compares the bit data Xn[7:0] to the previous bit data Xn−1[7:0] using the method according to the variation ΔST of the control value ST to inspect the bit data X.

FIG. 13A illustrates an example of bit data inspection in a case where ΔST=1. The present example exemplifies a case where the control value ST is changed from 1 to 2. In this case, the bit data Xn[7:0] is "11000011" and the previous bit data Xn−1[7:0] is "11100001."

In a case where ΔST=1, since the bit data Xn[7:0] is obtained by shifting the previous bit data Xn−1[7:0] to the higher side by 1 bit, the corrector 25 compares Xn[i] to Xn−1[(i+1)mod 8] (i=0-7) as indicated by the dotted line. When Xn[i] is not coincident with Xn−1[(i+1)mod 8] (i=0-7) as the result of comparison, the corrector 25 detects a bit error and corrects the bit data Xn[7:0] based on the previous bit data Xn−1 [7:0].

FIG. 13B illustrates an example of bit data inspection in a case where ΔST=2. The present example exemplifies a case where the control value ST is changed from 1 to 3. In this case, the bit data Xn[7:0] is "10000111" and the previous bit data Xn−1[7:0] is "11100001."

In a case where ΔST=2, since the bit data Xn[7:0] is obtained by shifting the previous bit data Xn−1[7:0] to the higher side by 2 (two) bits, the corrector 25 compares Xn[i] to Xn−1[(i+2)mod 8] as indicated by the dotted line. When Xn[i] is not coincident with Xn−1[(i+2)mod 8] as the result of comparison, the corrector 25 detects a bit error and corrects the bit data Xn[7:0] based on the previous bit data Xn−1 [7:0]. In the meantime, in a case where ΔST=0, the corrector 25 compares Xn[i] to Xn−1[i].

As described above, since the corrector 25 detects an error of the bit data X to correct the bit data X, an abnormality in the reception clock signal RxCLK due to an erroneous bit data X is prevented.

According to the clock regeneration method, SONET requirements for jitter components defined in ITU-T Recommendation G.825 may be satisfied.

FIG. 14 illustrates an example of jitter component calculation. In the present example, the reception clock signal RxCLK of the reception signal S2 of the SONET-OC3 is regenerated and the output rate of the SERDES 24 is set to 155.52 (MHz). Further, in the present example, the widths n of the bit data to be input to the SERDES 24 are set to 8-bit, 16-bit, 32-bit, and 64-bit, respectively, and the data rates of the bit data are set to 1.24416 Gbps, 2.48832 Gbps, 4.97664 Gbps, and 9.95328 Gbps, respectively.

When the reference clock signal CLKr and the frequency of the clock component of the SONET-OC3 are set to 155.52 (MHz)±20 (ppm), the maximum value of frequency deviation is 40 ppm. Therefore, the frequency difference Δf between the reference clock signal CLKr and the frequency of the clock component becomes 155.52 (MHz)×40 (ppm)/1000000=6220 (Hz) at the maximum.

In a case where the width n of the bit data is 8-bit, the shift controller 22 may adjust the phase of the reception clock signal RxCLK ⅛ clock by ⅛ clock (which equals to 0.125 UI (unit interval)). Accordingly, the number of phase adjustment times is 6220/(⅛)=49760 (times). Therefore, the UI and the frequency of the jitter component are 0.125 and 49.76 kHz, respectively. In the meantime, the jitter component for the widths n of the other bit data are also calculated by the same method as described above.

As described above, the transmission apparatus according to the embodiment extracts reception data RxDT and a clock component en from a received signal S2 and transmits the reception data RxDT based on a reception clock signal RxCLK which is synchronized with the clock component en. The transmission apparatus includes a frequency difference detector 20, a shift controller 22, and a SERDES 24.

The frequency difference detector 20 detects a frequency difference Δf between the clock component en and the reception clock signal RxCLK. The shift controller 22 selects the bit data X according to the frequency difference Δf from a plurality of bit data, which are obtained by shifting the bit patterns where "0s" and "1s" are respectively continued by different number of bits, respectively, and outputs the bit data X to the SERDES 24. The SERDES 24 converts the bit data X selected by the shift controller 22 into serial data and outputs the bit data X as a reception clock signal RxCLK.

According to the above-described configuration, the transmission apparatus selects the bit data X according to the frequency difference Δf between the reception clock signal RxCLK and the clock component en and converts the selected bit data X into serial data so as to regenerate the reception clock signal RxCLK. In this case, since the bit data X is selected from a plurality of bit data, which are obtained by shifting the bit patterns where "0s" and "1s" are respectively continued by different number of bits, respectively, the phase of the reception clock signal RxCLK is shifted according to the selection.

Accordingly, the frequency of the reception clock signal RxCLK is coincident with that of the clock component en and thus, the reception clock signal RxCLK may be synchronized with the clock component en. Accordingly, the transmission apparatus according to the embodiment may regenerate the reception clock signal RxCLK with a small scale configuration without using a component dedicated to clock.

The clock regeneration method according to the embodiment extracts the reception data RxDT and a clock component en from a received signal S2 and regenerates the reception clock signal RxCLK which is synchronized with the clock component en in order to transmit the reception data RxDT. The clock regeneration method includes the following operations.

Operation (1): Detecting a frequency difference Δf between the clock component en and the reception clock signal RxCLK.

Operation (2): Selecting the bit data X according to the frequency difference Δf from a plurality of bit data, which are obtained by shifting the bit patterns where "0s" and "1s" are respectively continued by different number of bits, respectively, to output the bit data X to the SERDES 24.

Operation (3): Converting the selected bit data X into serial data to output the bit data X as the reception clock signal RxCLK.

The clock regeneration method according to the embodiment includes the similar configuration to that of the transmission apparatus and thus, exhibits the similar acting effects to the contents described above.

The above-described embodiment is an appropriate embodiment of the present disclosure. However, the present disclosure is not limited thereto and may be embodied by adopting various modifications thereto within a scope without departing from a gist of invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus configured to extract reception data and a first clock from a received signal and transmit the reception data based on a second clock synchronized with the first clock, the transmission apparatus comprising:
   a detector configured to detect a frequency difference between the first clock and the second clock;
   a selector configured to select parallel data according to the frequency difference from a plurality of parallel data obtained by shifting bit patterns formed by bits of continuing "0" and continuing "1" by different number of the bits with each other, and
   a converter configured to convert the parallel data selected by the selector into serial data so as to be the second clock,
   wherein, in a case where the frequency difference is equal to or larger than a predetermined value, the selector selects the parallel data such that a phase of the second clock is shifted to be larger than the phase of the second clock in a case where the frequency difference is smaller than the predetermined value.

2. The transmission apparatus according to claim 1, wherein the detector includes a first counter configured to perform a count operation in synchronization with the first clock and a second counter configured to perform a count operation in synchronization with the second clock, and the detector calculates a difference between counter values of the first counter and the second counter so as to detect the frequency difference.

3. The transmission apparatus according to claim 1, wherein the selector maintains the selected parallel data in a case where there is no frequency difference.

4. The transmission apparatus according to claim 1, further comprising:
   a correction unit configured to detect an error in the plurality of parallel data and correct the detected error.

5. A clock regeneration method comprising:
   extracting reception data and a first clock from a received signal;
   regenerating a second clock synchronized with the first clock to transmit the reception data;
   detecting a frequency difference between the first clock and the second clock;
   selecting parallel data according to the frequency difference from a plurality of parallel data obtained by shifting bit patterns formed by bits of continuing "0" and continuing "1" by different number of the bits each other; and
   converting the selected parallel data into serial data so as to be the second clock,
   wherein, in a case where the frequency difference is equal to or larger than a predetermined value, the parallel data is selected such that a phase of the second clock is shifted to be larger than the phase of the second clock in a case where the frequency difference is smaller than the predetermined value.

6. The clock regeneration method according to claim 5, wherein a difference between counter values of a first counter performing a count operation in synchronization with the first clock and a second counter performing a count operation in synchronization with the second clock is calculated so as to detect the frequency difference.

7. The clock regeneration method according to claim 5, wherein the selected parallel data is maintained in a case where there is no frequency difference.

8. The clock regeneration method according to claim 5, further comprising:
   detecting an error in the plurality of parallel data; and
   correcting the detected error.

* * * * *